(12) United States Patent
Christie

(10) Patent No.: US 11,363,797 B2
(45) Date of Patent: *Jun. 21, 2022

(54) GAME FEEDER

(71) Applicant: Jeffrey Chad Christie, Deville, LA (US)

(72) Inventor: Jeffrey Chad Christie, Deville, LA (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/741,123

(22) Filed: Jan. 13, 2020

(65) Prior Publication Data

US 2020/0146258 A1 May 14, 2020

Related U.S. Application Data

(63) Continuation of application No. 16/153,939, filed on Oct. 8, 2018, now Pat. No. 10,531,638, which is a continuation-in-part of application No. 15/601,217, filed on May 22, 2017, now Pat. No. 10,091,971, which is a continuation of application No. 14/706,036, filed on May 7, 2015, now Pat. No. 9,655,342.

(51) Int. Cl.
*A01K 5/02* (2006.01)
*A01K 39/014* (2006.01)

(52) U.S. Cl.
CPC .......... *A01K 5/0225* (2013.01); *A01K 39/014* (2013.01)

(58) Field of Classification Search
CPC ...... A01K 5/02; A01K 5/0225; A01K 39/012; A01K 5/0291; A01K 39/014; A01K 5/0114; A01C 17/001; A01C 17/005
See application file for complete search history.

(56) References Cited

U.S. PATENT DOCUMENTS

| | | | | |
|---|---|---|---|---|
| 3,195,508 A | * | 7/1965 | Lehman | A01K 5/0291 119/51.11 |
| 4,688,520 A | * | 8/1987 | Parks | A01K 5/0275 119/51.11 |
| 4,986,220 A | * | 1/1991 | Reneau | A01K 5/02 119/57.91 |
| 5,033,411 A | * | 7/1991 | Brucker | A01K 39/012 119/52.2 |
| 5,368,192 A | * | 11/1994 | Ransom, II | A01K 5/0291 221/277 |
| 6,082,300 A | * | 7/2000 | Futch | A01K 5/02 119/51.11 |
| 7,222,583 B2 | * | 5/2007 | Foster | A01K 61/80 119/57.91 |
| 7,798,098 B1 | * | 9/2010 | Patterson | A01K 5/0225 119/51.11 |

(Continued)

*Primary Examiner* — Trinh T Nguyen
(74) *Attorney, Agent, or Firm* — Gregory M. Howison

(57) ABSTRACT

A game feeder having a recessed game feed spinner plate, which discharges game feed through a relatively narrow opening. The spinner plate is rotated by an electric motor, which is housed in a protective enclosure within the game feeder, along with the battery and timer, and protected from animals. The narrow discharge opening minimizes feed loss by animals accessing the spinner plate. The game feeder may sit on the ground, or may be mounted on a support such as a pole or tree with mounting hooks and a bracket, and when mounted is especially resistant to feed loss or feeder damage by bears, feral hogs and the like.

3 Claims, 7 Drawing Sheets

(56) References Cited

U.S. PATENT DOCUMENTS

| | | | | |
|---|---|---|---|---|
| 7,849,816 | B2* | 12/2010 | Dollar, Jr. | A01K 39/014 |
| | | | | 119/57.91 |
| 8,607,736 | B1* | 12/2013 | Plant | A01K 61/80 |
| | | | | 119/57.91 |
| 8,683,948 | B2* | 4/2014 | Gerke | A01K 5/0225 |
| | | | | 119/57.91 |
| 8,689,737 | B2* | 4/2014 | Gates | A01K 5/0225 |
| | | | | 119/53 |
| 9,462,783 | B2* | 10/2016 | Gates | A01K 5/0225 |
| 2005/0241588 | A1* | 11/2005 | Foster | A01K 5/0291 |
| | | | | 119/57.91 |
| 2006/0283396 | A1* | 12/2006 | Hernandez | A01K 5/0225 |
| | | | | 119/51.13 |
| 2010/0307421 | A1* | 12/2010 | Gates | A01K 39/012 |
| | | | | 119/56.1 |

* cited by examiner

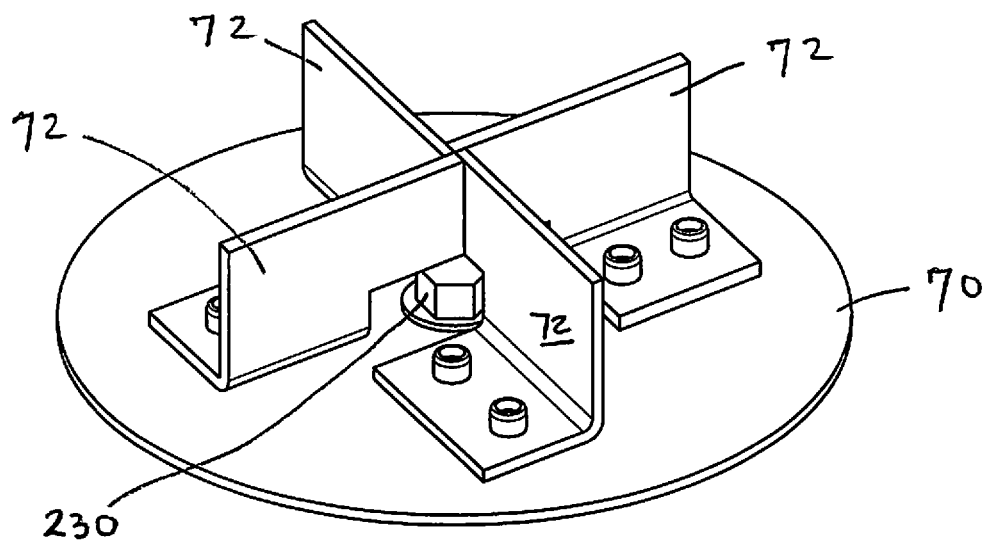
FIG. 8
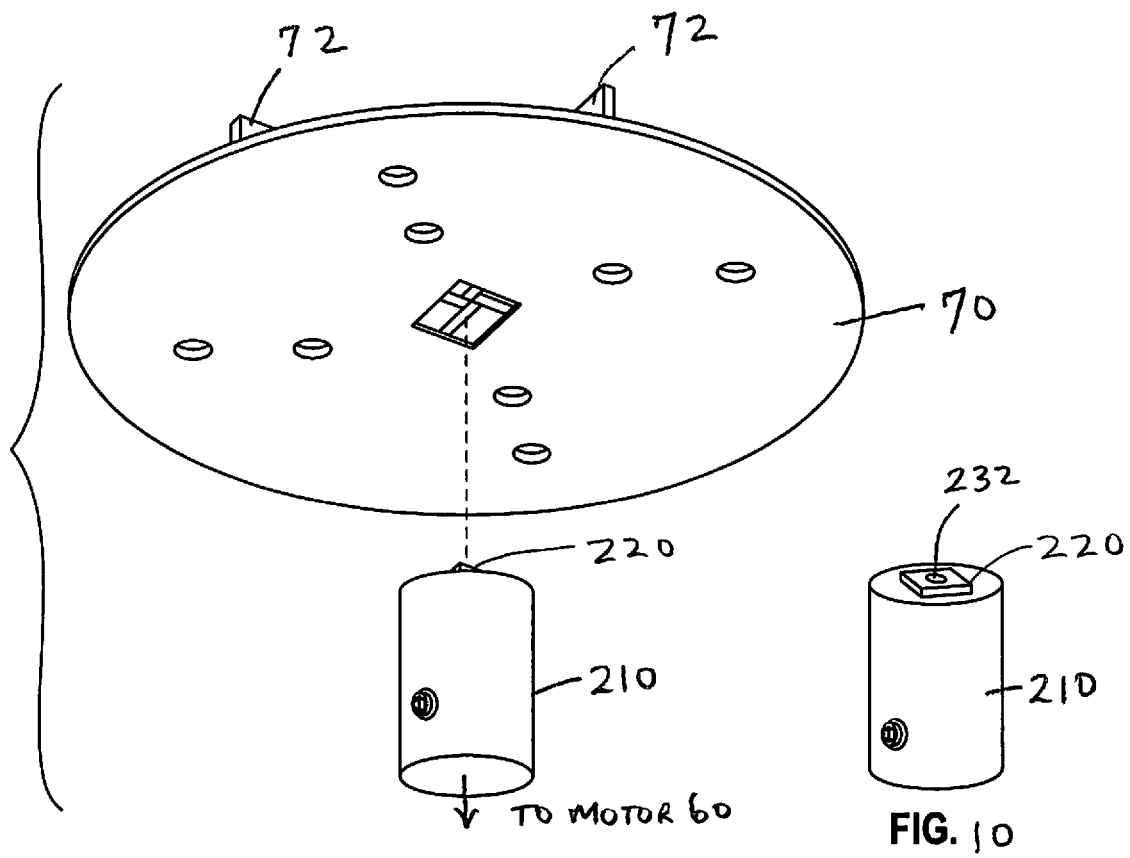
FIG. 9
FIG. 10

GAME FEEDER

CROSS REFERENCE TO RELATED APPLICATIONS

This application is a continuation of U.S. patent application Ser. No. 16/153,939, filed Oct. 8, 2018, currently, which was a continuation in part application of U.S. patent application Ser. No. 15/601,217, filed May 22, 2017, now U.S. Pat. No. 10,091,971, issued Oct. 9, 2018, which is a continuation of U.S. patent application Ser. No. 14/706,036, filed May 7, 2015, now U.S. Pat. No. 9,655,342, issued May 23, 2017.

BACKGROUND—FIELD OF THE INVENTION

This invention relates, generally, to apparatus for dispensing feed, generally dry feed such as corn (referred to as "game feed" or "feed"), to wildlife for the purpose of attracting the wildlife to a particular location. Such apparatus are commonly known as "game feeders." For example, such game feeders are commonly used to dispense corn to attract deer to a particular location in proximity to a hunting stand, for hunting purposes.

While such game feeders have taken many forms, one common form is the broadcast type feeder, which has a feed container or reservoir which feeds corn or other feed by gravity to a rotating spinner plate, having vanes thereon. The spinner plate is driven by an electric motor, usually battery powered, which turns on at desired times (usually controlled by a timer). The spinner plate throws the corn out some distance from the feeder. Many prior art feeders of this type are elevated several feet above the ground, to aid in broadcasting the corn and in an effort to limit unwanted taking of the corn by varmints.

A common issue with game feeders is the unwanted eating of the corn, while still in the feeder, by unwanted vermin, such as raccoons, squirrels, etc., combined with the destruction of the game feeder by vermin such as wild hogs and bears. Raccoons can be a particularly difficult animal to deal with, as their mobility and dexterity in use of their paws (which are nearly like a human hand) permits them to reach onto and into surfaces to steal corn. Other varmints that either steal corn or other feed, or interfere with the game feeder itself, are squirrels, opossums, birds, etc.

Common game feeders have a number of limitations:
- elevated feeders pose issues with loading the feeder with corn, as heavy bags of corn must be lifted up to pour into the feeder
- elevated feeders are prone to being knocked over by feral hogs and bears, and when the feeder is on the ground the corn can be pilfered by varmints such as raccoons and the like
- the exposed motors, batteries, timers, spinner plates, etc. of common feeders are frequently damaged by varmints, particularly raccoons
- varmints, particularly squirrels and raccoons, are able to reach into the area of the feeder from which the corn flows, and even if the feeder is not damaged can eat significant amounts of corn
- exposed motors, wiring, timers/controls, and spinner plates are subject to weather damage if simply placed on the ground, unsecured, the feeders are easily knocked over by bears, hogs, cows, etc.

Suffice to suggest that known prior art feeders have a number of limitations which result in loss of the expensive corn to unwanted animals, and/or destruction of the feeder itself by animals.

SUMMARY OF THE INVENTION

A game feeder embodying the principles of the present invention comprises a main body having an upper reservoir section, sized to hold a desired volume of game feed. The game feeder further comprises a base plate disposed within said main body, defining a bottom surface of the reservoir section, said base plate shaped so as to funnel game feed to an opening in the base plate through which game feed can flow. A discharge plate is disposed within the main body, below the base plate, the discharge plate extending in an upwardly sloping direction to a discharge opening in a wall of the main body. A spinner plate is disposed in an opening in the discharge plate, the spinner plate comprising one or more upwardly extending vanes, and the spinner plate disposed below the opening in said base plate so as to receive game feed onto the spinner plate as game feed flows from said reservoir section. The spinner plate is positioned sufficiently far back from said discharge opening to minimize animal depradation. A guide wall is disposed on the discharge plate, around at least a portion of the spinner plate. A rotary drive, which may be an electric motor, is attached to said spinner plate, said rotary drive shielded from outside access. A battery, wiring, timer, etc. are provided to control the motor.

In one embodiment, a spinner plate is provided which comprises a particular arrangement of the upwardly extending vanes, along with an improved connection between the spinner plate and the rotary drive. The vanes may be formed from sheet metal, with each of the four vanes being separate from one another, and are preferably arranged so as to minimize bending of the
blades by virtue of interaction between the blades. The rotary drive is connected to the spinner plate by a cylindrical spindle, which has a square shoulder on an end distal from the rotary drive and which fits into a square hole in the center of the spinner plate. The square shoulder disposed in the square hole rotationally locks the spindle and spinner plate together. A screw holds the spinner plate to the spindle.

BRIEF DESCRIPTION OF THE DRAWINGS

FIG. 8 is an upper perspective view of another embodiment of the spinner plate, vanes and related elements.

FIG. 9 is a lower, exploded view of the spinner plate and related elements in FIG. 8.

FIG. 10 is a perspective view of the spindle in FIGS. 8 and 9.

DESCRIPTION OF THE PRESENTLY PREFERRED EMBODIMENT(S)

While various game feeders can embody the principles of the present invention, with reference to the drawings some of the presently preferred embodiments can be described.

Figure 1:
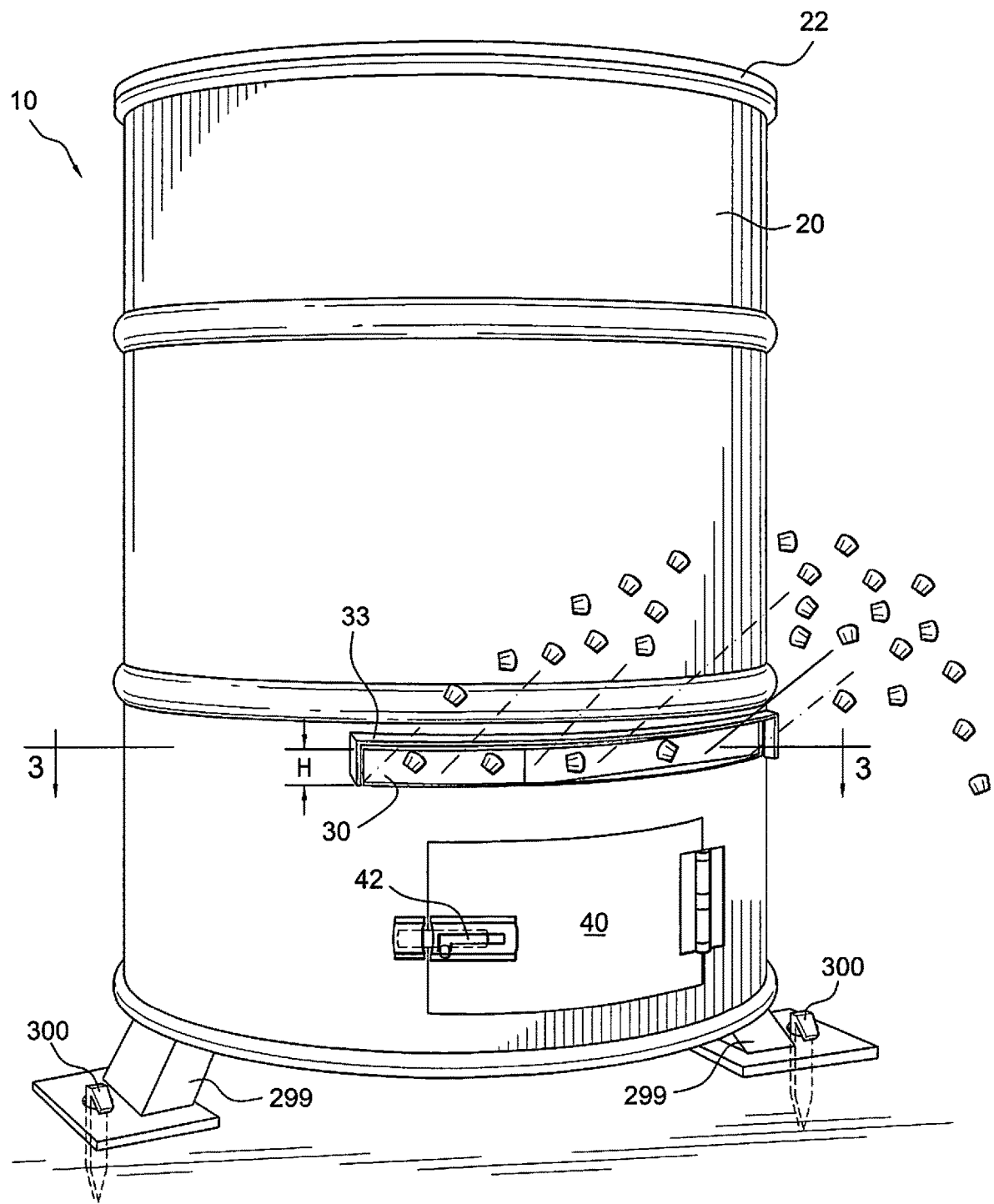
FIG. 1 is a perspective view of one embodiment of a game feeder embodying the principles of the present invention, while discharging feed (corn).

As can be seen in FIG. 1, game feeder 10 comprises a main body 20, typically an cylindrical body comprising a wall and an interior space. Main body 20 may be formed from thin metal, plastic, or other materials known in the art. A discharge opening 30 is formed in the wall of main body 20, simply by cutting a suitably sized opening in the wall or by other means. A removable lid section 22 may be provided to access the interior of the game feeder to fill it with feed. Alternatively, an access door, hatch, etc. may be provided in the top of main body 20 to permit filling the feeder.

An access door 40 is provided, which preferably has a latch or lock 42 to keep access door 40 closed. Access door 40, as described further herein, permits access to the motor, timer, battery, etc., which are all in a recessed and sheltered position.

Figure 2:
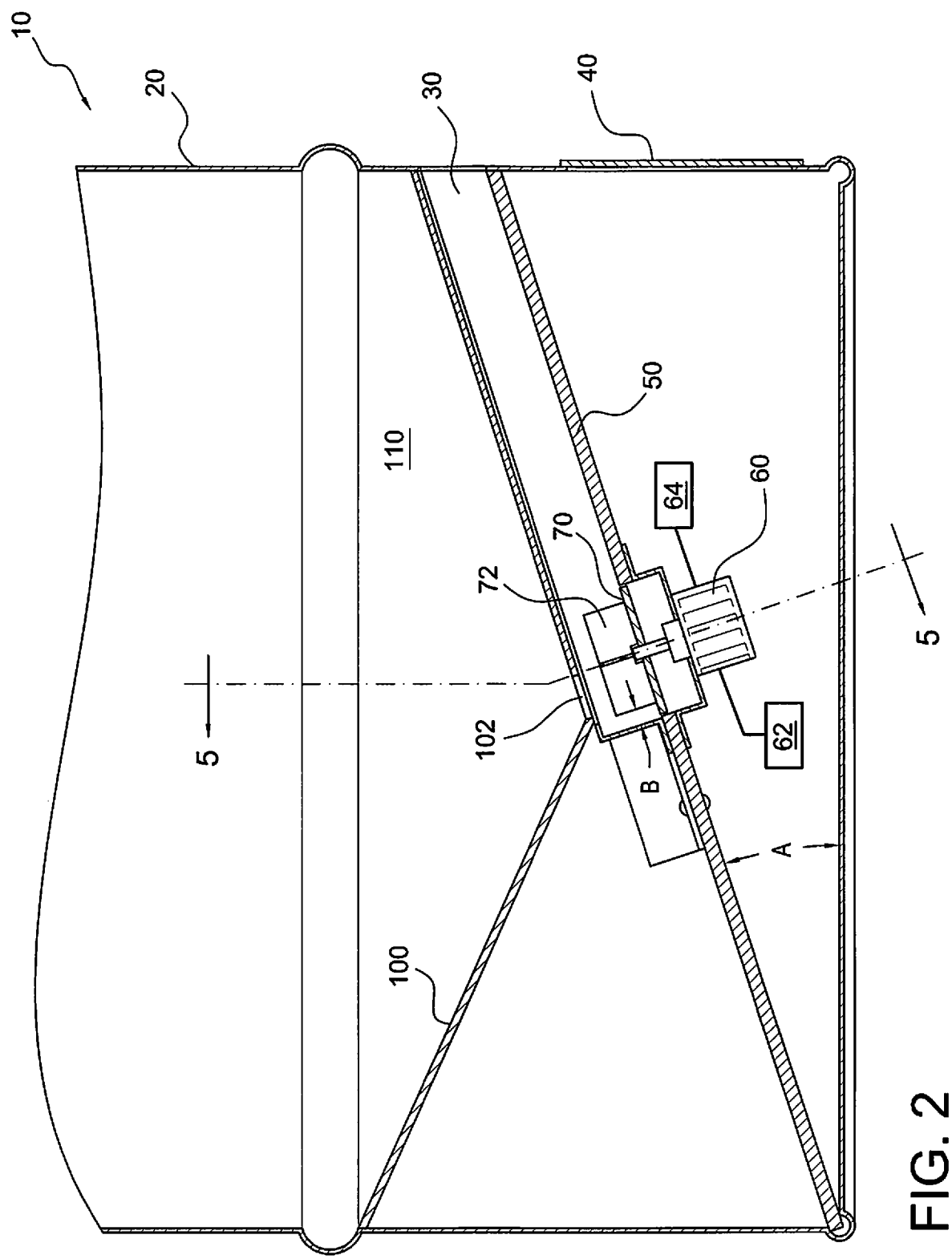
FIG. 2 is a section view of part of the game feeder.

Referring to FIG. 2, a discharge plate 50 is positioned inside main body 20, typically in a lower section of main body 10. In the position shown in FIG. 2, the base of main body 20 is substantially horizontal (i.e. the game feeder is in a substantially upright position, as in FIG. 1). As can be seen in FIG. 2, discharge plate 50 is preferably angled upwardly toward discharge opening 30; as can be understood from this description, the angle of discharge plate 50 largely controls the angle (from the horizontal) which the game feed is discharged, and permits the game feed to be discharged greater distances. While various slopes or degrees of angle may be suitable, one presently preferred angle A is in the range of 20 degrees from the horizontal. This permits the game feed to be discharged at suitable distances from game feeder 10. It is understood that other angles, lesser or greater, for example in the range of 10 degrees to 40 degrees, are possible. As can be readily seen from the drawings, especially FIG. 1, discharge opening 30 is elongated in a generally horizontal direction (when the game feeder is viewed in the position in FIG. 1), and has a height H sufficiently small to minimize animal depradation.

With reference to FIGS. 2-5, a motor 60, typically an electric motor with a rotating drive shaft, typically a battery driven electric motor, is mounted beneath discharge plate 50 by a suitable bracket or other means. As can be seen in FIG. 2, motor 60 is housed within main body 10, and accessible for replacement, repair, etc. via access door 40, but is otherwise shielded from the elements and from varmints, especially raccoons and the like. Various types of suitable drive motors are well known in the relevant art. A controller or timer mechanism 62, also well known in the art, is preferably coupled to motor 60 (and/or to battery 64), which turns motor 60 on and off at desired intervals, thereby controlling when game feed is discharged from game feeder 10. This timing may be adjusted so as to lure game animals into range at desired times during the day or night. A battery 64 or other suitable energy source provides electric power to the motor 60.

Figure 3:
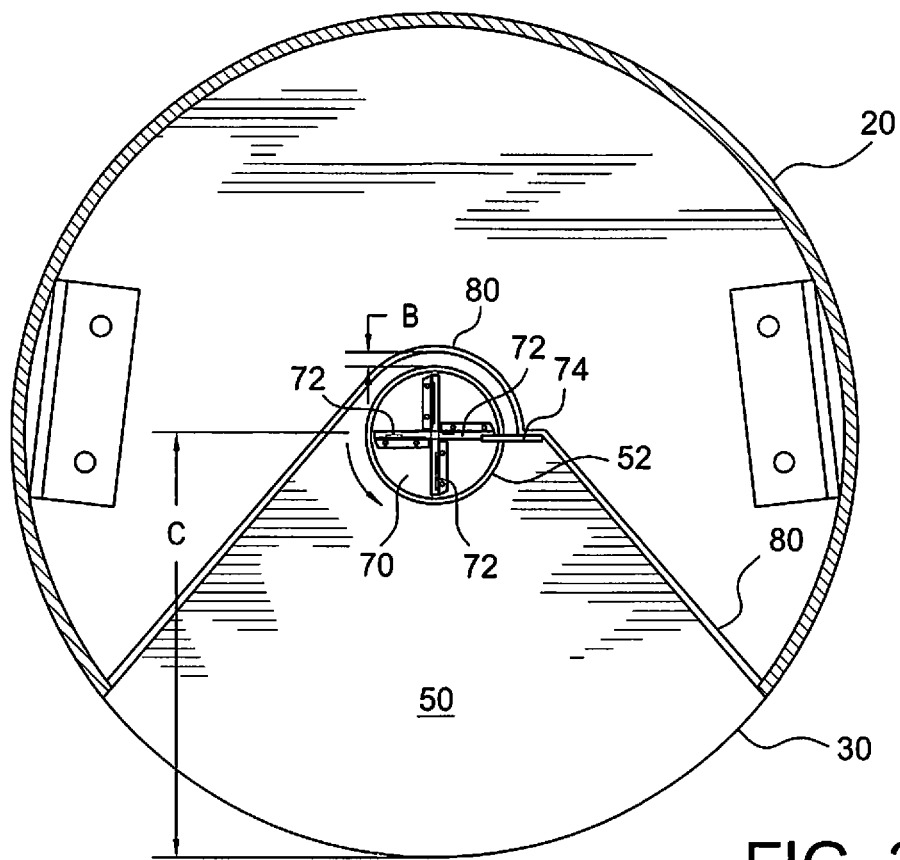
FIG. 3 is a bird's-eye view of the interior of the feeder, looking down on the base plate and spinner plate.
Figure 4:
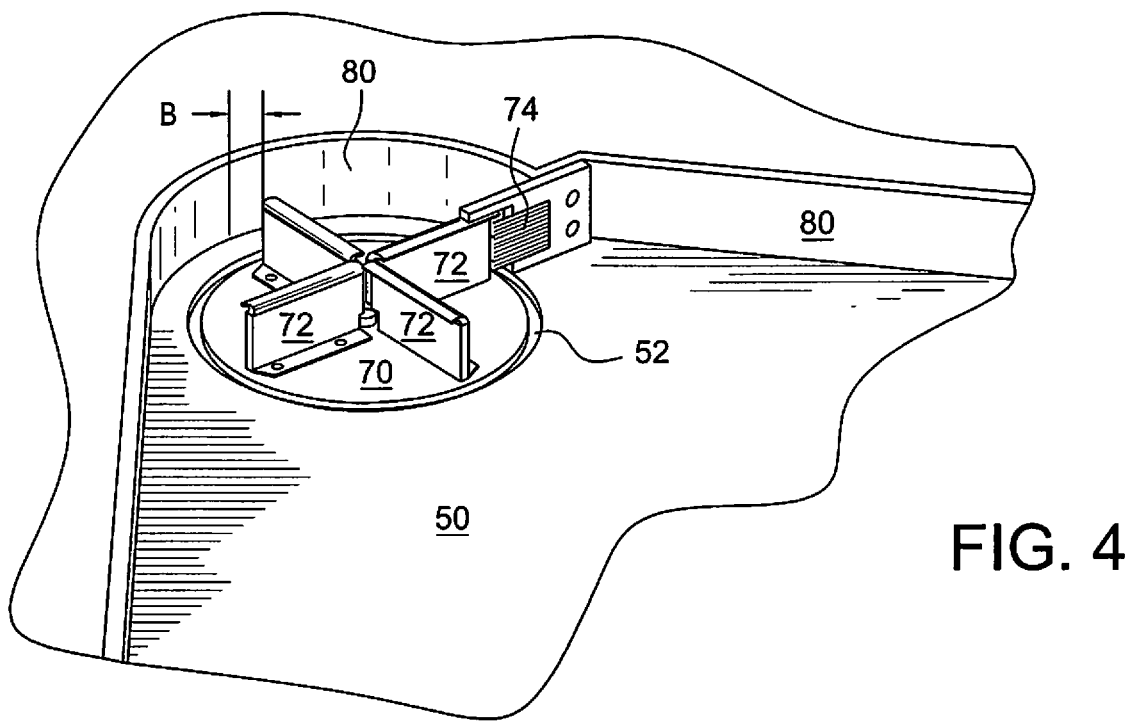
FIG. 4 is a perspective view of the spinner plate, vanes, and a section of the base plate and guide wall.

A spinner plate 70 is attached to the drive shaft of motor 60, so that spinner plate 70 is spun by motor 60. Spinner plate 70 comprises one or more upwardly extending vanes 72, which contact and throw or discharge the game feed from the game feeder, as later described. While a total of four vanes are shown in the embodiment shown in the figures, it is understood that a lesser (for example, two) or greater (for example, six) number of vanes could be used. Preferably, vanes 72 do not extend to the very edge of the spinner plate, but instead terminate a short distance, for example ⅛" or so, from the edge of the spinner plate; this clearance helps to avoid jamming. Further, as can be seen in FIG. 4, spinner plate 70 is disposed within an opening in discharge plate which is slightly larger in diameter than the diameter of the spinner plate; for example, the diameter of opening 52 is approximately ⅛" larger than the diameter of spinner plate 70; this dimension may be between about 1/16" and ¼". This gap between spinner plate 70 and opening 52, see FIGS. 3 and 4, permits water and debris to fall down through the gap, into the area within main body 20 below discharge plate, and reduces jamming of spinner plate 70. In order to reduce the likelihood of varmints, for example raccoons, from reaching spinner plate 70 and stealing feed, spinner plate 70 is preferably positioned a suitable distance C away from discharge opening 32 to minimize animal depradation, for example between about 4" and 12", for example 8" or so, as can be seen in FIG. 3. It is understood that other spacings are possible within the scope of the invention.

A guide wall 80 extends from the edges of discharge opening 30 around discharge plate 70, generally forming a semi-circular profile (when viewed from above, as in FIG. 3) around spinner plate 70. Guide wall 80 serves several purposes, including constraining the game feed as it flows from reservoir 110 in a suitable position to be flung out by rotating vanes 72, to guiding the game feed out of discharge opening 30 and out of game feeder 10. As can be seen in FIGS. 3 and 4, a small distance B is provided between the rearmost edge of opening 52 and the rearmost part of guide wall 80, for example ⅛".

Figure 5:
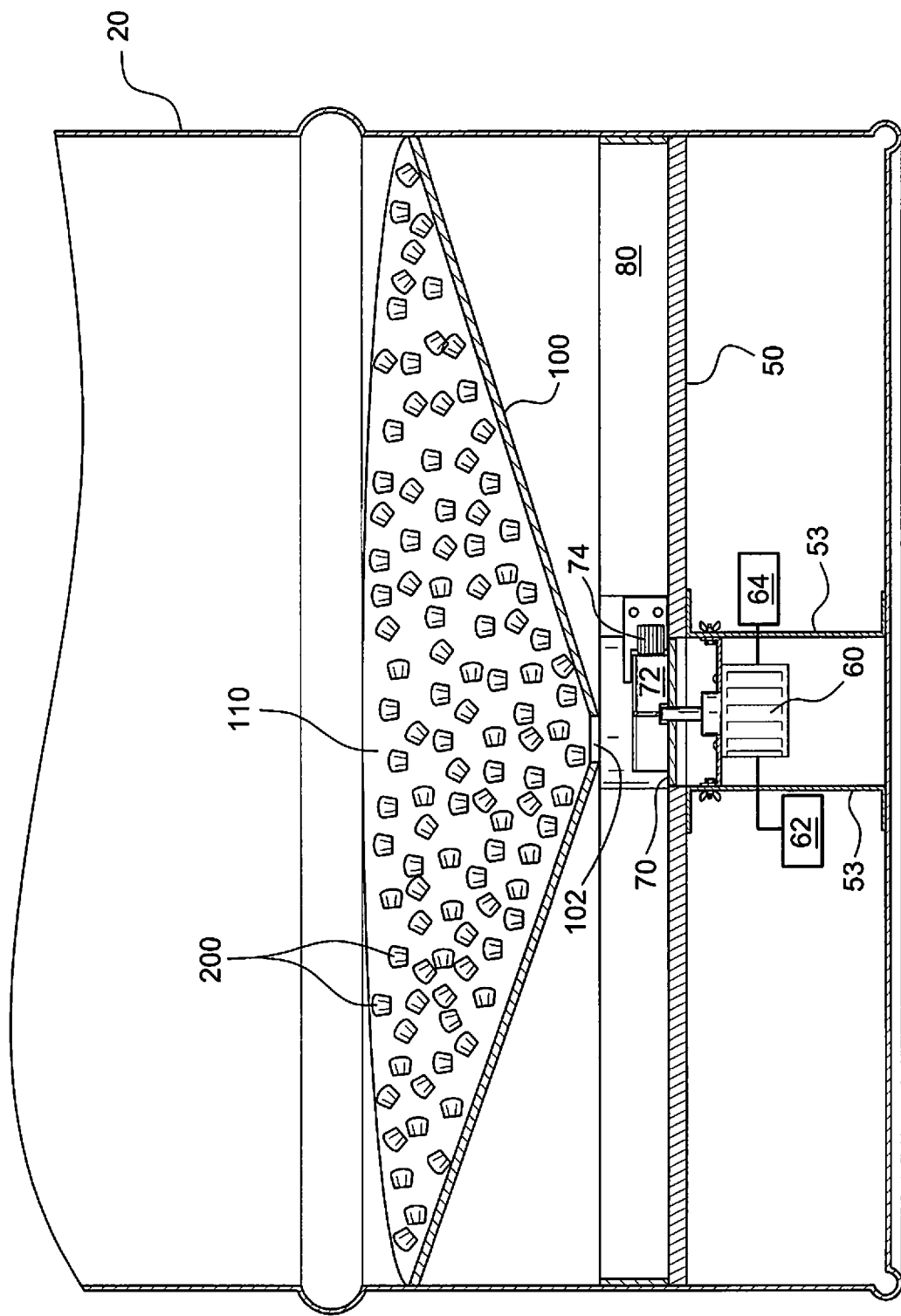
FIG. 5 is a section view along the line indicated in FIG. 2.
Figure 6:
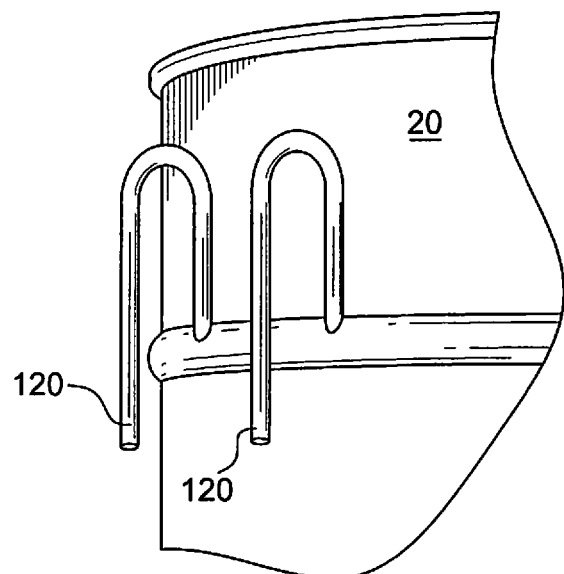
FIG. 6 shows mounting hooks on the game feeder.
Figure 7:
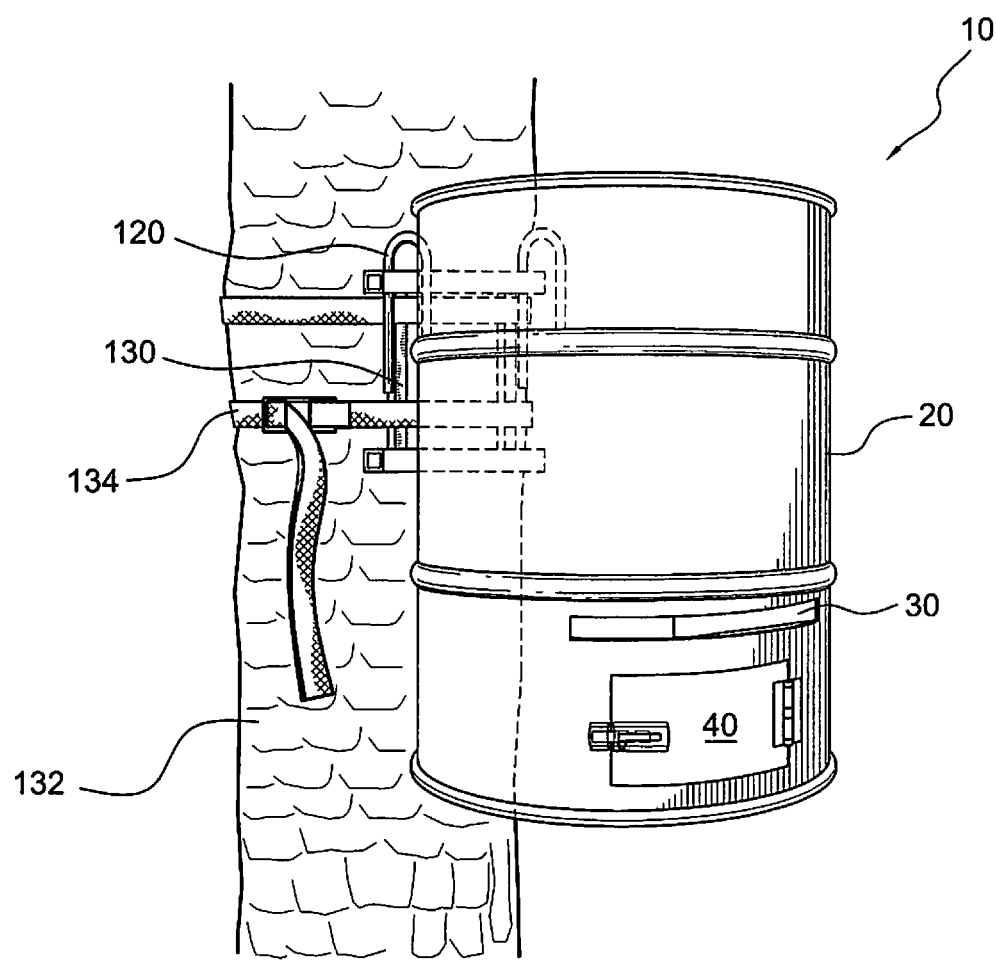
FIG. 7 is a perspective view of the game feeder mounted on a tree, by the mounting hooks shown in FIG. 6.

A base plate 100 is positioned within main body 20, above discharge plate 50, spinner plate 70, etc., and forming a reservoir 110 generally in an upper section of the interior of main body 10. As can be seen in FIG. 5, base plate 100 is preferably generally cone-shaped, tapering down to opening 102, through which game feed 200 (as can be seen in FIG. 5, for illustrative purposes on two grains of corn are annotated) can flow by gravity to spinner plate 70. It is understood that other shapes of base plate 100 may be used, the common function being to funnel or channel game feed to opening 102. Opening 102 is preferably positioned over spinner plate 70 generally as indicated in FIGS. 3 and 5, in a position near the side of spinner plate 70 and guide wall 80 rearmost from discharge opening 30. By way of example only, opening 102 may be somewhat oval shaped, with dimensions of 1¼"×2", which has been found to provide a reasonable flow of game feed to spinner plate and vanes 70 and 72. It is understood that these dimensions are by way of example only.

Preferably, a flexible tab or brush member 74 is mounted on guide wall 80, on one side of spinner plate 70, which vanes 72 move through as they rotate. Brush member 74 prevents game feed or other debris from rolling back down discharge plate 30 and causing jamming of spinner plate 70 and/or vanes 72. Note that in the exemplary embodiment shown in the drawings, for example FIG. 3, spinner plate 70 is rotating in a counter-clockwise direction, as indicated in FIG. 3. It is understood that either counter-clockwise or clockwise rotation is possible, with the elements of the game feeder changed to accommodate the direction of rotation.

Game feeder 10 may be placed upright on the ground or on short legs, e.g. 3", held in position by stakes 300 and the like driven into the ground (see FIG. 1), or alternatively may be mounted in an elevated position on a pole or tree to make the game feeder even more varmint-proof, and to permit throwing game feed a greater distance from game feeder 10. In particular, mounting game feeder 10 on a support, such as a pole or tree in an elevated position minimizes damage and feed loss due to bear activity. To do so, a means for mounting game feeder 10 in an elevated position may be provided, which in one embodiment comprises a first attachment on game feeder 10 which mates with a second attachment on the support (tree or pole). For example, a first attachment comprising mounting hooks 120 may be provided on main body 20, for example on the back side of main body 20. A second attachment comprising a mount base 130 may be fastened to a support, such as tree 132 (or pole, etc.) by straps 134, etc. Mounting hooks 120 slide into receiving areas on mount base 130, thereby mounting game feeder 10 in a desired elevated position, suspended above a ground surface. It is understood that preferably game feeder 10 may be easily removed and re-mounted simply by lifting game feeder up and disengaging it from mount base 130, and reversing the process to again mount it. It is understood that various embodiments of releasable mounting may be configured. For example, mounting hooks 120 may be fixed to the support, while the mount base may be fixed to the game feeder.

Game feeder 10 may be made in dimensions to suit any particular setting. For example, the capacity of reservoir 110 may be made large enough to hold a substantial volume of game feed, for example 200 lbs. of corn.

It is to be noted that various attributes of game feeder 10 are designed to minimize predation of the game feed (i.e. unwanted taking of the feed by varmint animals) and damage to the game feeder by knocking it over (also then getting feed out of it), destruction of the motor, wiring, etc. With regard to reducing predation, a discharge opening 30 of limited height dimensions is a key aspect of the game feeder embodying the principles of the present invention, as such limited dimensions minimize the ability of raccoons and squirrels to reach any game feed that is present on the spinner plate. By way of example, a discharge opening having a height of approximately 1¼" height is sufficiently large to permit easy discharge of game feed, yet prevents raccoons and squirrels from physically entering the discharge opening with their full bodies, forcing them to "reach" inside to get corn or other game feed. Depending upon the particular setting and/or animals dealt with, a larger or smaller opening may be provided, for example within the range of about ½" to 2½". As previously noted, yet another aspect is positioning the spinner plate far enough back from discharge opening 30 that the spinner plate is largely beyond the reach of varmints such as raccoons; a dimension of 8" is believed to provide a good balance between minimizing predation yet still permitting proper discharge of game feed. Depending upon the particular setting and/or animals dealt with, a larger or smaller spacing may be provided, for example within the range of about 4" to 12". As previously noted, motor 60 as well as battery 64 and timer 62 are all positioned within and protected by main body 20, so they cannot be damaged by raccoons or other vermin, weather, etc. With regard to reducing losses by feral hogs and bears, both of which may knock the feeder over, the feeder may be either staked down (if positioned on the ground or on short legs), or preferably the feeder is mounted in an elevated position on a pole or tree, via the hook and bracket or other means, as previously described.

Use of the Game Feeder

Use of game feeder 10 is straight forward. With game feeder 10 in a convenient location, for example on the ground, a desired volume of game feed is placed within reservoir 110 within main body 20, for example corn. A removable lid 22 (or other similar access means) enables access to reservoir 110 but keeps rain, varmints, etc. from the game feed within. The relatively low height of main body 20 eases loading the game feeder with feed.

If the game feeder is to remain on the ground, if desired it can be staked in position. If the game feeder is to be placed in an elevated position, it may be more convenient to mount it in said position first then fill it with game feed.

It is understood, and as can be seen from FIG. 5, that game feed will flow by gravity out of opening 102 to spinner plate 70, until the available space is filled (namely, the space between the rearmost guide wall and the spinner plate). Flow of course then stops.

When motor 60 is turned on (via timer 62 or other suitable means), spinner plate 70 and vanes 72 spin at relatively high rotational speed, vanes 72 hitting the feed and throwing it along discharge plate 50 and out discharge opening 30 to a distance from game feeder 10. Feed discharge will continue until motor 60 is stopped.

Materials and Fabrication

Suitable materials for the various parts of game feeder 10 include metals, plastics, or any other suitable materials and combinations thereof. Certain components, for example motor 60, timer 62 and battery 64 are commercially available components known in the art. Fabrication may be by cutting, welding, adhesives, fasteners such as screws, nuts and bolts, riveting, etc.

Another Embodiment of the Spinner Plate and Related Elements

One embodiment of game feeder 10, shown in FIGS. 8-11, comprises an improved spinner plate 70 and vanes 72, along with an improved connection between motor 60 and spinner plate 70.

Figure 11:
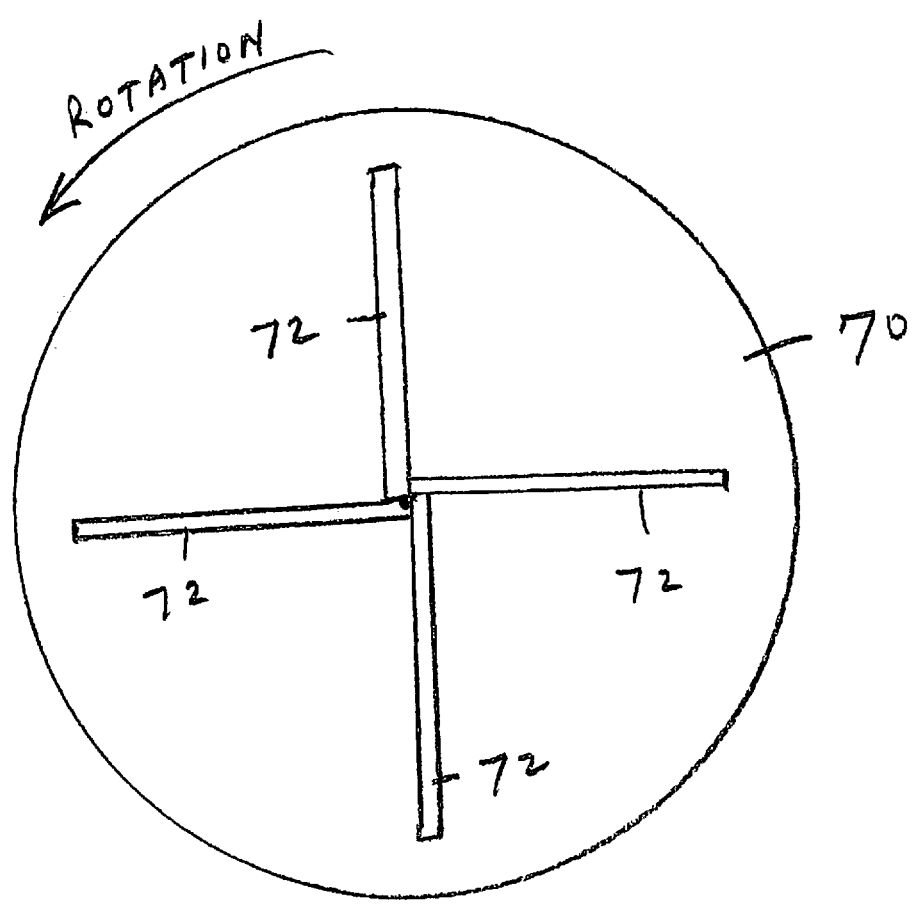
FIG. 11 is a top view of the spinner plate and vanes in FIGS. 8 and 9.

Referring to FIGS. 8-11, in this embodiment vanes 72 are each separate vanes (four in number in the illustrated embodiment, although other numbers are possible), and are preferably formed from a relatively thin, bendable material such as sheet metal. Each of vanes 72 may be attached to spinner plate 70 by rivets or other suitable means. Referring to FIGS. 8 and 11, an exemplary direction of rotation of spinner plate 70 is shown, and it can be seen that vanes 72 are preferably positioned such that each vane 72 is prevented from bending "backwardly," opposite in direction to the direction of rotation of spinner plate 70, by its contact with an adjacent vane, which is positioned substantially perpendicular thereto. As can be seen in FIG. 8, and in further detail in FIG. 11, each of vanes 72 has an inner end which terminates substantially at or near a center point of spinner plate 70, and a distal end (that is, distal from the center point of spinner plate 70) which terminates at a point spaced from the outer edge of spinner plate 70. FIG. 11 is a top view of spinner plate 70 and vanes 72, and gives an additional view of a preferred embodiment of the positioning of vanes 72, one to another.

In addition, this embodiment comprises an improved connection between spinner plate 70 and motor 60. Referring particularly to FIGS. 9 and 10, a spindle 210 is disposed between spinner plate 70 and motor 60, for example attached to a drive shaft of motor 60. Spindle 210 comprises a non-circular shoulder 220 on its end distal from motor 60, which engages a mating non-circular hole 222 in the center of spinner plate 70. A square shoulder 220 and mating square hole 222 are a presently preferred embodiment, although it is understood that other non-circular shapes, e.g. rectangular, oval, triangular, polygonal, etc. could be used. A screw or similar connector 230, engaged in threaded hole 232 in spindle 210, connects spinner plate 70 to spindle 210. It can be readily understood that non-circular shoulder 220, engaged in mating non-circular hole 222, rotationally locks spinner plate 70 and spindle 210 together.

CONCLUSION

While the preceding description contains many specificities, it is to be understood that same are presented only to describe some of the presently preferred embodiments of the invention, and not by way of limitation. Changes can be made to various aspects of the invention, without departing from the scope thereof. For example, the dimensions of the various components of the game feeder, including but not limited to the capacity, may be varied to suit particular applications.

Therefore, the scope of the invention is to be determined not by the illustrative examples set forth above, but by the appended claims and their legal equivalents.

I claim:

1. A game feeder, comprising:
   a main body having an upper reservoir section, said reservoir section sized to hold a desired volume of game feed;
      a base plate disposed within said main body, defining a bottom surface of said reservoir section, said base plate shaped so as to funnel game feed to an opening in said base plate through which game feed can flow;
      a discharge plate disposed within said main body, below said base plate, said discharge plate extending in an upwardly sloping direction to a discharge opening in a wall of said main body, said discharge opening being elongated in a generally horizontal direction and having a height sufficiently small to minimize animal depradation;
      a weather guard attached to an exterior of said wall, positioned proximal an upper edge of said discharge opening and spanning substantially all of a length of said discharge opening;
   a spinner plate disposed in an opening in said discharge plate, said spinner plate comprising one or more upwardly extending vanes, said spinner plate disposed below said opening in said base plate so as to receive game feed onto said spinner plate as said game feed flows from said reservoir section, said spinner plate positioned sufficiently far back from said discharge opening to minimize animal depradation, wherein each of said vanes is formed from a bendable material and attached to said spinner plate, each of said one or more vanes positioned such that bending of said vanes, in a direction opposite to the direction of rotation of said spinner plate, is resisted by contact with at least one other of the one or more vanes;
   a guide wall disposed on said discharge plate, around at least a portion of said spinner plate and extending substantially to said discharge opening; and
   a motor attached to said spinner plate and adapted to rotate said spinner plate, a battery providing energy to said motor and a timer controlling rotation of said motor, said motor, said battery and said timer disposed within said main body and shielded from outside access,
   wherein said spinner plate is attached to said motor by a spindle disposed between said spinner plate and said motor, said spindle comprising a non-circular shoulder at an end distal from said motor, said spinner plate comprising a mating non-circular hole to receive said noncircular shoulder, thereby rotationally locking said spindle and said spinner plate.

2. The game feeder of claim 1, wherein said weather guard protrudes sufficiently far from said exterior of said wall so as to minimize rain entry into said discharge opening.

3. The game feeder of claim 2, wherein said weather guard further comprises vertical sections at either end of said discharge opening, spanning substantially said height of said discharge opening.

* * * * *